United States Patent
Yoo et al.

(10) Patent No.: US 12,430,541 B2
(45) Date of Patent: Sep. 30, 2025

(54) METHOD AND DEVICE WITH NEURAL NETWORK MODEL

(71) Applicants: SAMSUNG ELECTRONICS CO., LTD., Suwon-si (KR); Seoul National University R&DB Foundation, Seoul (KR)

(72) Inventors: Sungjoo Yoo, Seoul (KR); Seungyeop Kang, Seoul (KR)

(73) Assignees: Samsung Electronics Co., Ltd., Suwon-si (KR); Seoul National University R & DB Foundation, Seoul (KR)

( * ) Notice: Subject to any disclaimer, the term of this patent is extended or adjusted under 35 U.S.C. 154(b) by 658 days.

(21) Appl. No.: 17/883,844

(22) Filed: Aug. 9, 2022

(65) Prior Publication Data
US 2023/0146493 A1 May 11, 2023

(30) Foreign Application Priority Data
Nov. 11, 2021 (KR) .................. 10-2021-0154992

(51) Int. Cl.
*G06N 3/048* (2023.01)
*G06F 5/01* (2006.01)
*G06F 7/544* (2006.01)

(52) U.S. Cl.
CPC .............. *G06N 3/048* (2023.01); *G06F 5/01* (2013.01); *G06F 7/5443* (2013.01)

(58) Field of Classification Search
CPC .......... G06N 3/048; G06F 5/01; G06F 7/5443
See application file for complete search history.

(56) References Cited

U.S. PATENT DOCUMENTS

| | | | |
|---|---|---|---|
| 10,915,298 B1* | 2/2021 | Far | G06N 3/065 |
| 11,074,072 B2 | 7/2021 | Nealis et al. | |
| 11,615,256 B1* | 3/2023 | Far | G06N 3/048 |
| | | | 341/126 |
| 2006/0195753 A1* | 8/2006 | Nam | H04L 1/1621 |
| | | | 714/749 |
| 2019/0342217 A1* | 11/2019 | Mazurek | H04L 47/11 |
| 2020/0310761 A1 | 10/2020 | Rossi et al. | |
| 2021/0125063 A1 | 4/2021 | Park | |
| 2021/0150313 A1* | 5/2021 | Roy | G06N 3/045 |
| 2021/0334028 A1* | 10/2021 | Ellis | G06F 3/0604 |
| 2022/0075596 A1* | 3/2022 | Agrawal | H03K 19/20 |
| 2023/0146493 A1* | 5/2023 | Yoo | G06F 5/01 |
| | | | 706/26 |

OTHER PUBLICATIONS

Martinez, et al. "Training binary neural networks with real-to-binary convolutions." *arXiv preprint arXiv:2003.11535* (Mar. 25, 2020). pp. 1-11.

\* cited by examiner

*Primary Examiner* — David E Choi
(74) *Attorney, Agent, or Firm* — NSIP Law

(57) ABSTRACT

A device includes: a comparator; an exclusive-NOR (XNOR) gate; an accumulator; and a multiplication and accumulation (MAC) operator, wherein a basic block of a neural network comprises a first batch normalization layer, a quantization layer, a convolution layer, an active layer, and a second batch normalization layer, and wherein the basic block is driven by the device by a combination of a first batch normalization operation, a sign function operation, a bitwise convolution operation, an activation function operation, a second batch normalization operation, and a residual connection operation.

19 Claims, 10 Drawing Sheets

METHOD AND DEVICE WITH NEURAL NETWORK MODEL

CROSS-REFERENCE TO RELATED APPLICATIONS

This application claims the benefit under 35 USC § 119(a) of Korean Patent Application No. 10-2021-0154992, filed on Nov. 11, 2021 in the Korean Intellectual Property Office, the entire disclosure of which is incorporated herein by reference for all purposes.

BACKGROUND

1. Field

The following description relates to a method and device with a neural network (NN).

2. Description of Related Art

A convolutional neural network, which is implemented in the field of artificial intelligence (AI), may have a higher performance than other AI technologies. However, when a convolutional artificial neural network (ANN) is deepened and widened to be trained with more data and achieve high performance, a size of a model of the convolutional ANN may be increased, and an operation time may increase based on the number of operations used for processing.

To resolve such issues, a method may reduce a size of a convolutional ANN. For example, there may be a method of designing a structure of the convolutional ANN to be slim (or lightweight), a method of training in which branches of an ANN are pruned, and a method of quantizing a value of a weight into fewer bits (n-bit quantization).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a device includes: a comparator; an exclusive-NOR (XNOR) gate; an accumulator; and a multiplication and accumulation (MAC) operator, wherein a basic block of a neural network comprises a first batch normalization layer, a quantization layer, a convolution layer, an active layer, and a second batch normalization layer, and wherein the basic block is driven by the device by a combination of a first batch normalization operation, a sign function operation, a bitwise convolution operation, an activation function operation, a second batch normalization operation, and a residual connection operation.

The comparator may be configured to quantize input data by comparing a result of performing the sign function operation on transformed input data with a predetermined value.

The second batch normalization operation may include a first portion and a second portion, and the transformed input data may reflect a second portion of first batch normalized input data determined using the first batch normalization operation.

The XNOR gate and the accumulator may be configured to perform the bitwise convolution operation.

The second batch normalization operation may include a first portion and a second portion, and the MAC operator may be configured to perform the activation function operation, the residual connection operation, and an operation for the first portion.

The MAC operator may be configured to: determine output data by applying the activation function to a bitwise convolution operation result of the bitwise convolution operation; multiply the first portion by the output data; and perform an operation of adding input data.

The activation function may include a rectified linear unit (ReLU) function.

In another general aspect, a processor-implemented method includes: quantizing input data by comparing a result of performing a sign function operation on transformed input data with a predetermined value using a comparator; performing a bitwise convolution operation using an exclusive-NOR (XNOR) gate and an accumulator; and performing an activation function operation and a residual connection operation using a multiplication and accumulation (MAC) operator.

A second batch normalization operation may include a first portion and a second portion, and the transformed input data may reflect a second portion of first batch normalized input data determined using the first batch normalization operation.

The second batch normalization operation may include a first portion and a second portion, and performing of operations using the MAC operator may include performing the activation function operation, the residual connection operation, and an operation for the first portion.

The performing of the operations using the MAC operator may include: determining output data by applying the activation function to a bitwise convolution operation result of the bitwise convolution operation; multiplying the first portion by the output data; and performing an operation of adding input data.

The activation function may include a rectified linear unit (ReLU) function.

A basic block of a neural network may include a first batch normalization layer, a quantization layer, a convolution layer, an active layer, and a second batch normalization layer, and the basic block may be driven by the quantizing of the input data, the performing of the bitwise convolution operation, and the performing of the activation function operation and the residual connection operation.

In another general aspect, one or more embodiments include a non-transitory computer-readable storage medium storing instructions that, when executed by one or more processors, configure the one or more processors to perform any one, any combination, or all operations and methods described herein.

In another general aspect, an electronic device includes: a host processor configured to control an operation of components comprised in the electronic device; and a hardware accelerator configured to process input data by executing a neural network based on a command of the host processor, wherein the hardware accelerator may include: a comparator; an exclusive-NOR (XNOR) gate; an accumulator; and a multiplication and accumulation (MAC) operator.

The comparator may be configured to quantize input data by comparing a result of performing a sign function operation on transformed input data with a predetermined value, the XNOR gate and the accumulator may be configured to perform a bitwise convolution operation, and the MAC operator may be configured to perform an activation function operation and a residual connection operation.

In another general aspect, a device includes: a hardware accelerator configured to, for a first neural network operation: quantize input data by comparing a predetermined value with a result of performing a sign function operation on transformed input data, the transformed input data being determined using a first batch normalization operation; perform a bitwise convolution operation on the quantized input data; determine output data by applying an activation function to a result of the bitwise convolution operation; multiply a first portion of a second batch normalization operation by the output data; and perform an operation of adding a result of the multiplying and input data.

A comparator of the hardware accelerator may be configured to perform the quantizing of the input data, an exclusive-NOR (XNOR) gate and an accumulator of the hardware accelerator may be configured to perform the bitwise convolution operation, and a multiplication and accumulation (MAC) operator of the hardware accelerator may be configured to perform the determining of the output data, the multiplying of the first portion by the output data, and the performing of the operation of adding.

The hardware accelerator may be configured to, for a second neural network operation, perform any one or any combination of any two or more of a pooling, a channel upscaling, and a third batch normalization operation based on a result of the performing of the operation of adding.

Other features and aspects will be apparent from the following detailed description, the drawings, and the claims.

Figure 1A:
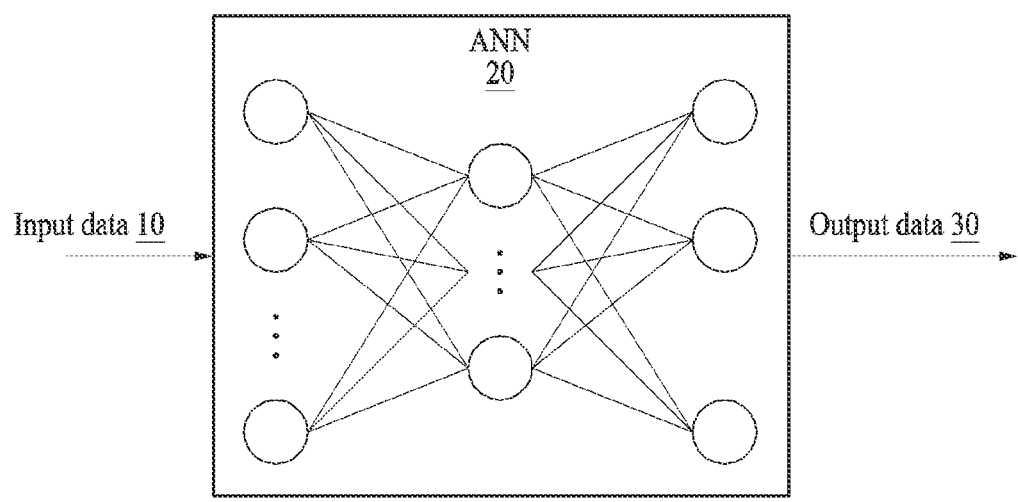
FIG. 1A illustrates an example of a deep learning calculation method using an artificial neural network (ANN).

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first" or "second" are used to explain various members, components, regions, layers, or sections, these members, components, regions, layers, or sections are not limited to the terms. Rather, these terms should be used only to distinguish one member, component, region, layer, or section from another member, component, region, layer, or section. For example, a "first" member, component, region, layer, or section referred to in examples described herein may also be referred to as a "second" member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

Examples may be implemented as various types of products, such as, for example, a personal computer (PC), a laptop computer, a tablet computer, a smartphone, a television (TV), a smart home appliance, an intelligent vehicle, a kiosk, and a wearable device. Hereinafter, examples will be described in detail with reference to the accompanying drawings. When describing the examples with reference to the accompanying drawings, like reference numerals refer to like components and a repeated description related thereto will be omitted.

FIG. 1A illustrates an example of a method of performing deep learning operations using an artificial neural network (ANN).

An artificial intelligence (AI) algorithm including deep learning may input input data 10 to the ANN and learn output data 30 through an operation, for example, a convolution operation. The ANN may be a computational architecture obtained by modeling. In the ANN, nodes may be connected to each other and collectively operate to process input data. Various types of neural networks may include, for example, a convolutional neural network (CNN), a recurrent neural network (RNN), a deep belief network (DBN), or a restricted Boltzmann machine (RBM), but are not limited thereto. In a feed-forward neural network, nodes may have links to other nodes. The links may be expanded in a single direction, for example, a forward direction, through a neural network. While the network may be referred to as an "artificial neural network", such reference is not intended to impart any relatedness with respect to how the network computationally maps or thereby intuitively recognizes information and how a biological brain operates. I.e., the term "artificial neural network" is merely a term of art referring to the hardware-implemented network.

Referring to FIG. 1A, an example of a structure in which the input data 10 is input to the ANN and the output data 30 is output through the ANN (e.g., a CNN 20) including one or more layers is illustrated. The ANN may be, for example, a deep neural network (DNN) including at least two layers.

The CNN 20 may be used to extract "features," for example, a border, a line, and a color from the input data 10. The CNN 20 may include a plurality of layers. Each of the layers may receive data, process data input to a corresponding layer, and generate data that is to be output from the corresponding layer. Data output from a layer may be a feature map generated by performing a convolution operation on an image or a feature map that is input to the CNN 20 and weight values of one or more filters (e.g., the filters 110-1 to 110-$n$ discussed below). Initial layers of the CNN 20 may operate to extract features of a relatively low level, for example, edges or gradients, from an input. Subsequent layers of the CNN 20 may gradually extract more complex features, for example, an eye or a nose in an image.

Figure 1B:
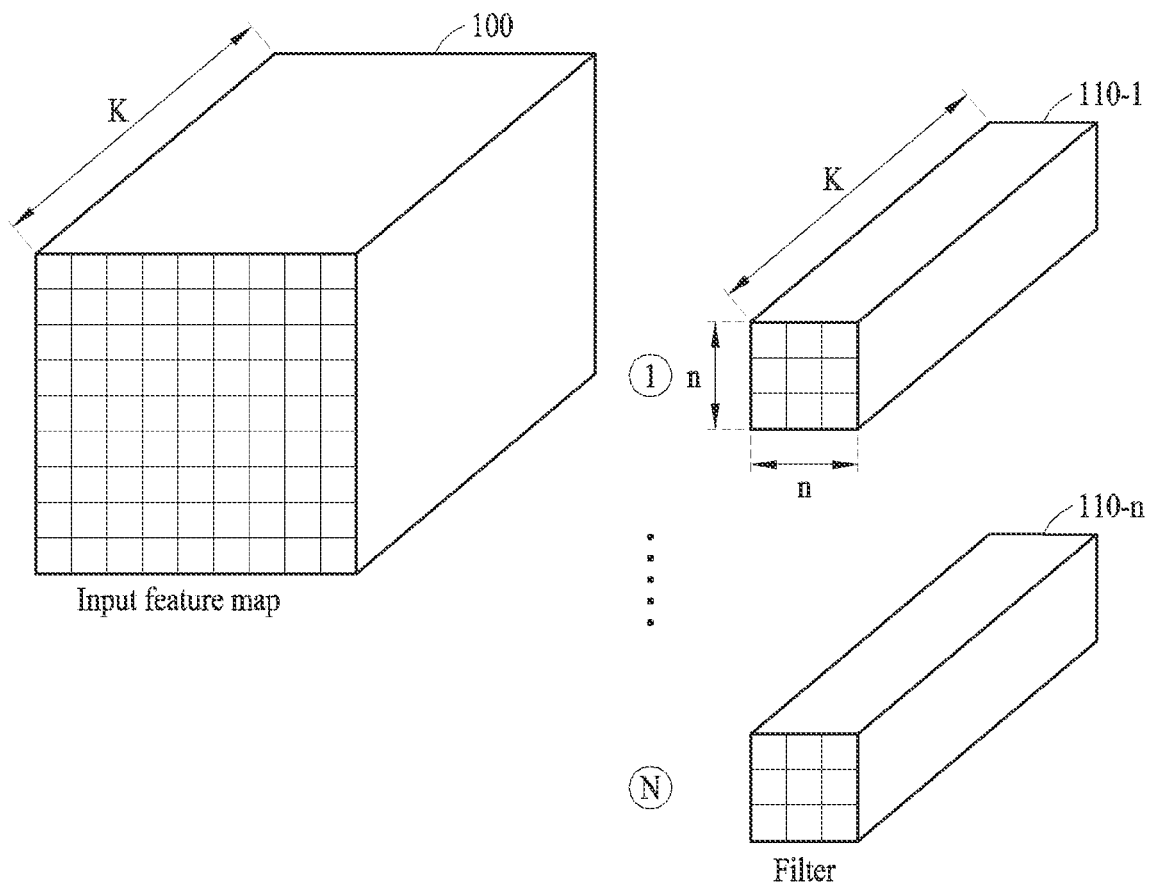
FIG. 1B illustrates an example of data and a filter of an input feature map provided as an input in a deep learning operation.

FIG. 1B illustrates an example of data and a filter of an input feature map provided as an input in a deep learning operation.

Referring to FIG. 1B, an input feature map 100 may be a set of numerical data or pixel values of an image input to an ANN, but is not limited thereto. In FIG. 1B, the input feature map 100 may be defined by pixel values of a target image that is to be trained using the ANN. For example, the input feature map 100 may have 256×256 pixels and a depth with a value of K. However, such values are merely provided as examples, and a size of the pixels of the input feature map 100 is not limited thereto.

N filters, for example, filters 110-1 to 110-$n$, may be formed. Each of the filters 110-1 to 110-$n$ may include n×n weights. For example, each of the filters 110-1 to 110-$n$ may have 3×3 pixels and a depth value of K. However, the size of each of the filters 110-1 to 110-$n$ is merely provided as an example and is not limited thereto.

Figure 1C:
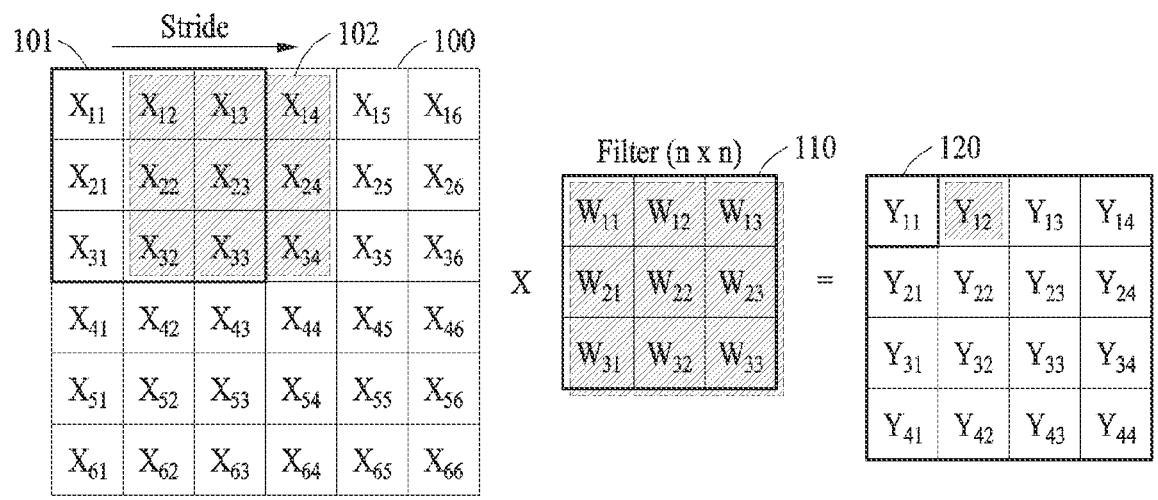
FIG. 1C illustrates an example of performing a deep learning-based convolution operation.

FIG. 1C illustrates an example of performing a deep learning-based convolution operation.

Referring to FIG. 1C, the process of performing a convolutional operation in an ANN may be the process of generating, in each layer, output values through a multiplication and addition (MAC) operation between an input feature map 100 and a filter 110, and generating an output feature map 120 using a cumulative sum of the output values.

The process of performing the convolution operation may include performing multiplication and addition operations by applying a preset size, that is, the filter 110 of an n×n size to the input feature map 100 from the upper left to the lower right in a current layer. Hereinafter, a process of performing a convolution operation using the filter 110 of a 3×3 size is described.

For example, firstly, an operation of multiplying 3×3 pieces of data in a first region 101 on the upper left side of the input feature map 100 by weight values w11 to w33 of the filter 110, respectively, is performed. Here, the 3×3 pieces of data in the first region 101 may be a total of nine pieces of data $x_{11}$ to $x_{33}$ including three pieces of data related to a first direction and three pieces of data related to a second direction. Thereafter, 1-1 output data $y_{11}$ in the output feature map 120 may be generated using a cumulative sum of the output values of the multiplication operation, where the output values of the multiplication operation are $x_{11} \times w_{11}$, $x_{12} \times w_{12}$, $x_{13} \times w_{13}$, $x_{21} \times w_{21}$, $x_{22} \times w_{22}$, $x_{23} \times w_{23}$, $x_{31} \times w_{31}$, $x_{32} \times w_{32}$, and $x_{33} \times w_{33}$.

Thereafter, an operation may be performed whereby the filter 110 is moved by a unit of data from the first region 101 to a second region 102 on the upper left side of the input feature map 100. In this example, the number of pieces of data shifted in the input feature map 100 for a convolution operation process is referred to as a stride, and a size of the output feature map 120 to be generated may be determined based on the stride. For example, when the stride is 1, an operation of multiplying a total of nine pieces of input data $x_{12}$ to $x_{34}$ included in the second region 102 by the weights $w_{11}$ to $w_{33}$ of the filter 110 may be performed, and 1-2 output data $y_{12}$ in the output feature map 120 may be generated using a cumulative sum of the output values of the multiplication operation, where the output values of the multiplication operation are $x_{12} \times w_{11}$, $x_{13} \times w_{12}$, $x_{14} \times w_{13}$, $x_{22} \times w_{21}$, $x_{23} \times w_{22}$, $x_{24} \times w_{23}$, $x_{32} \times w_{31}$, $x_{33} \times w_{32}$, and $x_{34} \times x_{33}$.

Figure 2:
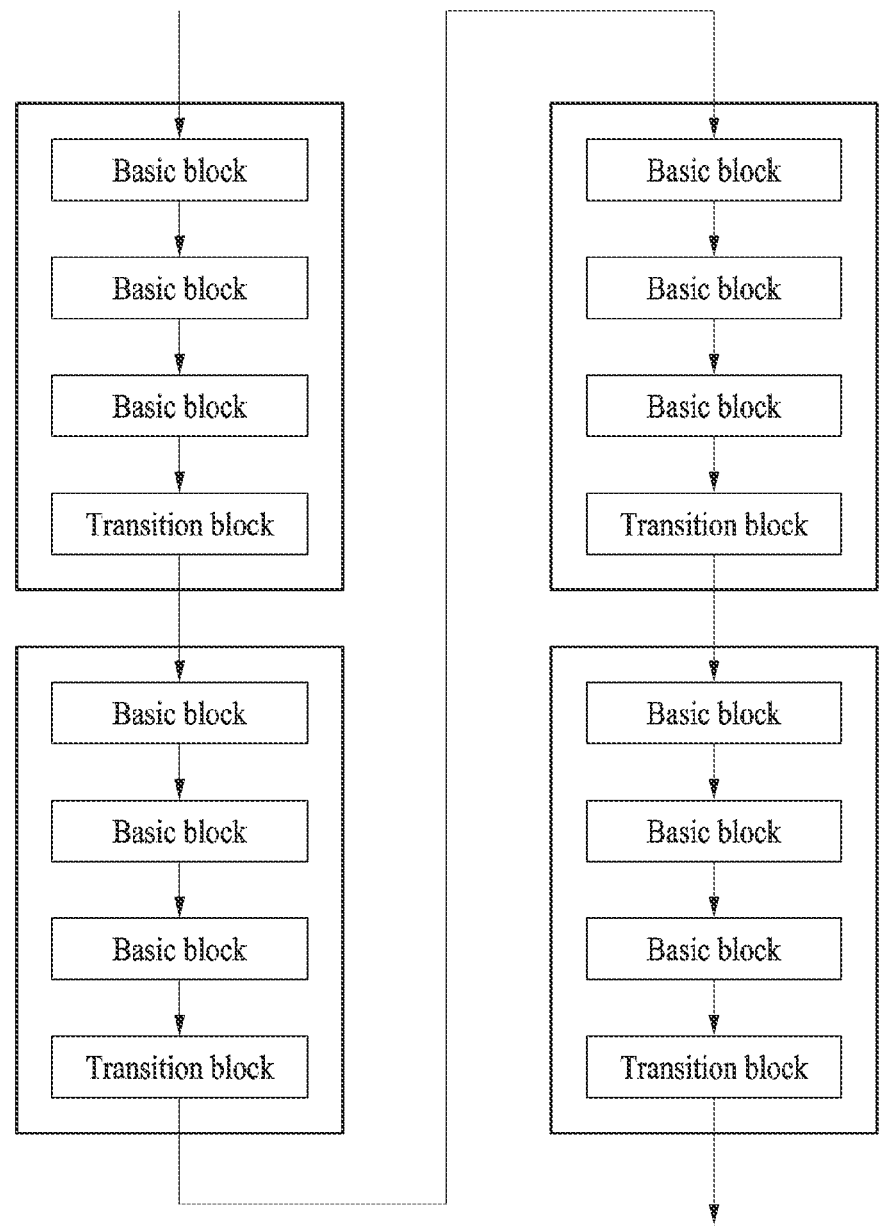
FIG. 2 illustrates an example of a structure of an ANN model.

FIG. 2 illustrates an example of a structure of an ANN model.

A typical lightweight neural network may include a binary ANN. While a binary ANN may significantly increase a speed of an existing ANN and reduce a memory capacity of an ANN model, information loss may occur due to existing floating point weights and activation functions being expressed as −1 and 1. Such information loss of the typical lightweight neural network may result in an accuracy decline, thereby bringing a performance degradation when an object is being recognized or detected.

For example, when the typical lightweight neural network maps positive numbers 1.4 and 0.2 to 1 because they are positive numbers, and such two values different in magnitude by 7 times are mapped to the same value, a quantization error may become extremely large. Thus, a binary quantization may be performed considering the magnitude of data using a scale factor in a typical binary ANN to reduce the quantization error. However, the scale factor may also need to be determined through time consuming training. In addition, since a scale-invariant feature is used, a depth may not be scalable in the typical binary ANN.

In contrast, an ANN model of one or more embodiments may be scalable to depth, and information loss may be reduced without using a scale factor.

Referring to FIG. 2, an example of an ANN model is illustrated. The ANN model may be formed by a combination of one or more basic blocks and one or more transition blocks.

That is, the ANN model may be formed by a plurality of unit blocks, and a unit block may be formed by a combination of one or more basic blocks and one or more transition blocks. However, as illustrated in FIG. 2, the ANN model may be formed by four unit blocks, and a unit block may include three basic blocks and one transition block, but the ANN model is not limited thereto. The number of unit blocks forming the ANN model may be changed, and the number of basic blocks and transition blocks may be changed.

Hereinafter, a non-limiting example method of operating a basic block is described in detail with reference to FIG. 3, and a non-limiting example method of operating a transition block is described in detail with reference to FIG. 4.

Figure 3:
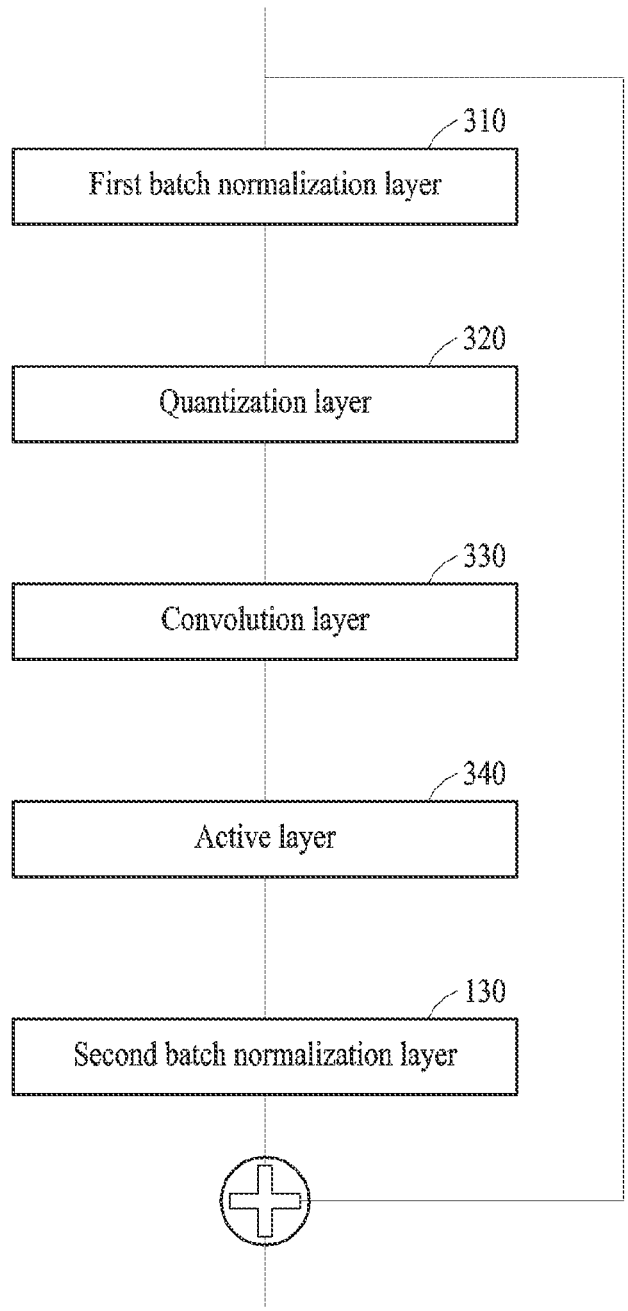
FIG. 3 illustrates an example of a method of operating a basic block.

FIG. 3 illustrates an example of a method of operating a basic block.

Referring to FIG. 3, a basic block may include a first batch normalization layer 310, a quantization layer 320, a convolution layer 330, an active layer 340, and a second batch normalization layer 350.

In an example, the first batch normalization layer 310 may stabilize a distribution of input data. The input data may include any one of an input feature map and a weight.

For example, a gradient descent may generally use all training data to update a gradient once. Thus, the ANN model may be updated once by obtaining the gradient for all training data and averaging all the gradients. However, processing a large amount of data at once may not be easily done with such a method, and thus data may be divided into batch units for training.

When training is performed in batches, an interval covariant shift in which a distribution of the input data is different for each layer may occur in the training process. That is, a batch normalization layer (e.g., the first batch normalization layer 310) may be used to resolve the difference in data for each batch.

Batch normalization may be a normalization using an average and a variance for each batch even when the data for each batch unit has various distributions, and the batch normalization layer may be a layer performing batch normalization.

The quantization layer 320 may quantize first batch normalized input data. The first batch normalized input data may be input data stabilized through the first batch normalization layer 310.

The quantization layer 320 may binarize the input data by applying a sign function to the first batch normalized input data. When the first batch normalized input data is a positive number, the quantization layer 320 may map the first batch normalized input data to 1, and when the first batch normalized input data is a negative number, the quantization layer 320 may map the first batch normalized input data to −1 by applying the sign function to the first batch normalized input data. In another example, the quantization layer 320 may quantize input data by applying a step function to the first batch normalized input data.

The convolution layer 330 may be a layer performing a convolution operation described with reference to FIG. 1C. For example, the convolution layer 330 may be a 3×3 convolutional layer.

The active layer 340 may be a layer converting a weighted sum of input data into output data using an activation function. For example, the active layer 340 may output 0 when the input data is less than 0 using a rectified linear unit (ReLU) function, and the active layer 340 may output existing input data (a linear function) when the input data is greater than 0.

The second batch normalization layer 350 may perform second batch normalization on output data. A basic block may additionally use the second batch normalization layer 350 and generate a stable distribution of output data without a scale factor. In addition, the second batch normalization layer 350 may adjust the distribution of the output data to be zero-centered.

The basic block may include a residual connection connecting the input data to second batch normalized output data. The residual connection may also be referred to as a skip connection or a shortcut connection. The basic block may take existing input data through the residual connection, and only remaining residual information may be additionally learned.

Figure 4:
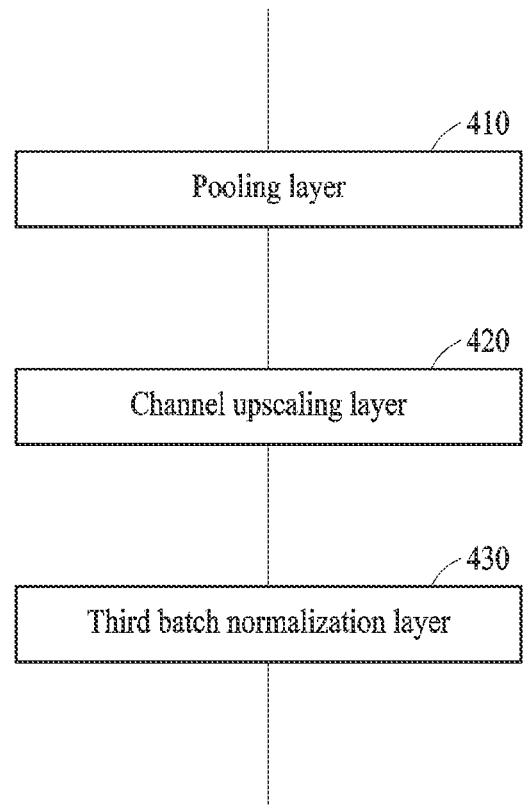
FIG. 4 illustrates an example of a method of operating a transition block.

FIG. 4 illustrates an example of a method of operating a transition block.

Referring to FIG. 4, a transition block may include a pooling layer 410, a channel upscaling layer 420, and a third batch normalization layer 430.

Various parameters may be used for handling or processing data of higher dimensions. However, when an excessive number of parameters are present, overfitting may occur in training. Thus, the method of one or more embodiments may reduce a dimension by reducing the number of parameters used in a filter.

A basic block may not change the magnitude of data, and thus a layer that may reduce the magnitude of data may be used such that the ANN model becomes scale-invariant.

The pooling layer 410 may perform downsampling on a width and height of output data of the basic block. For example, the pooling layer 410 may extract an average of values in a determined size by performing average pooling.

The channel upscaling layer 420 may be a channel duplicate layer, which duplicates a channel by a predetermined multiple.

The transition block may reset a variance to 1 through the third batch normalization layer 430.

Figure 5:
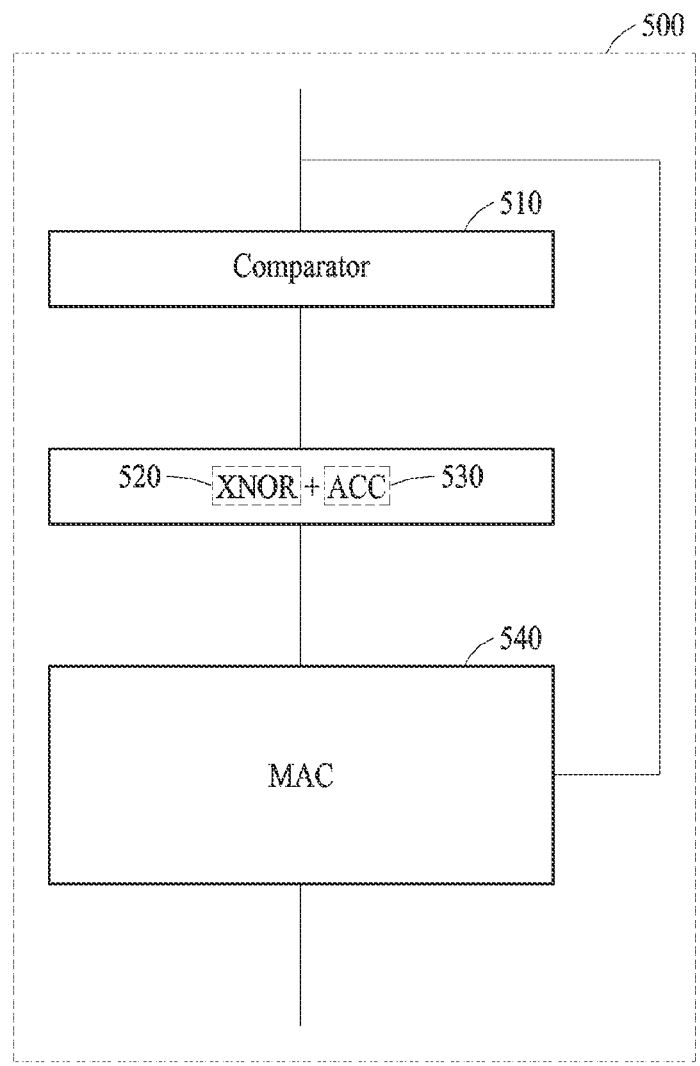
FIG. 5 illustrates an example of an electronic device for driving a basic block.

FIG. 5 illustrates an example of an electronic device for driving a basic block.

An electronic device 500 (e.g., an electronic apparatus) for driving the basic block may include a comparator 510, an exclusive-NOR (XNOR) gate 520, an accumulator 530, and a multiplication and accumulation (MAC) operator 540.

In an example, input data may be input to the comparator 510, and an output of the comparator 510 may be input to the XNOR gate 520 and the accumulator 530, and an output and input data of the XNOR gate 520 and the accumulator 530 may be input to the MAC operator 540.

The input data described with reference to FIGS. 1 to 4 may be data input to the comparator 510, the quantized input data described with reference to FIGS. 1 to 4 may be an output of the comparator 510 generated based on the input data, the data obtained by performing a convolution operation described with reference to FIGS. 1 to 4 may be an output of the XNOR gate 520 and the accumulator 530 generated based on the quantized input data, and the second batch normalized output data described with reference to FIGS. 1 to 4 may be output data of the MAC operator 540 generated based on the data obtained by performing the convolution operation.

Hereinafter, a method of operating an electronic device for driving a basic block is described in detail with reference to FIGS. 6 and 7.

Figure 6:
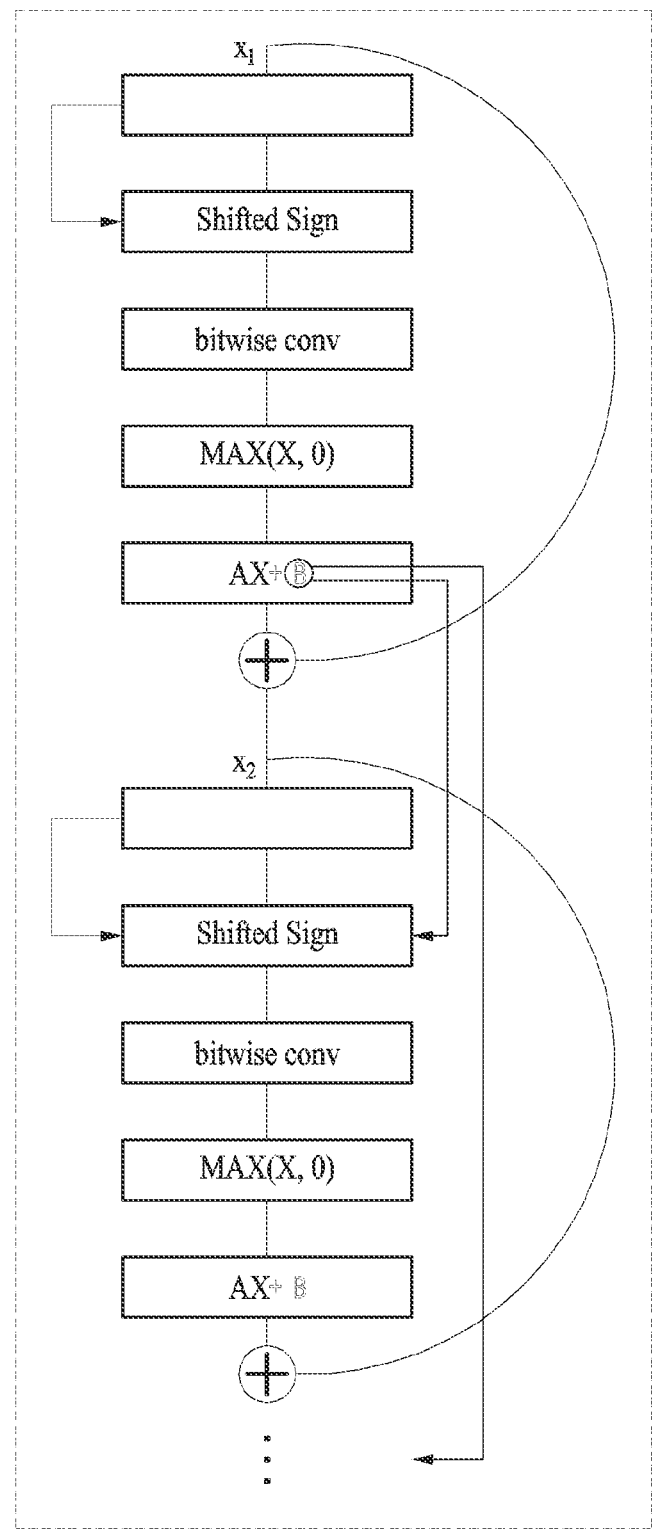
FIGS. 6 and 7 illustrate an example of an electronic device for driving a basic block.
Figure 7:
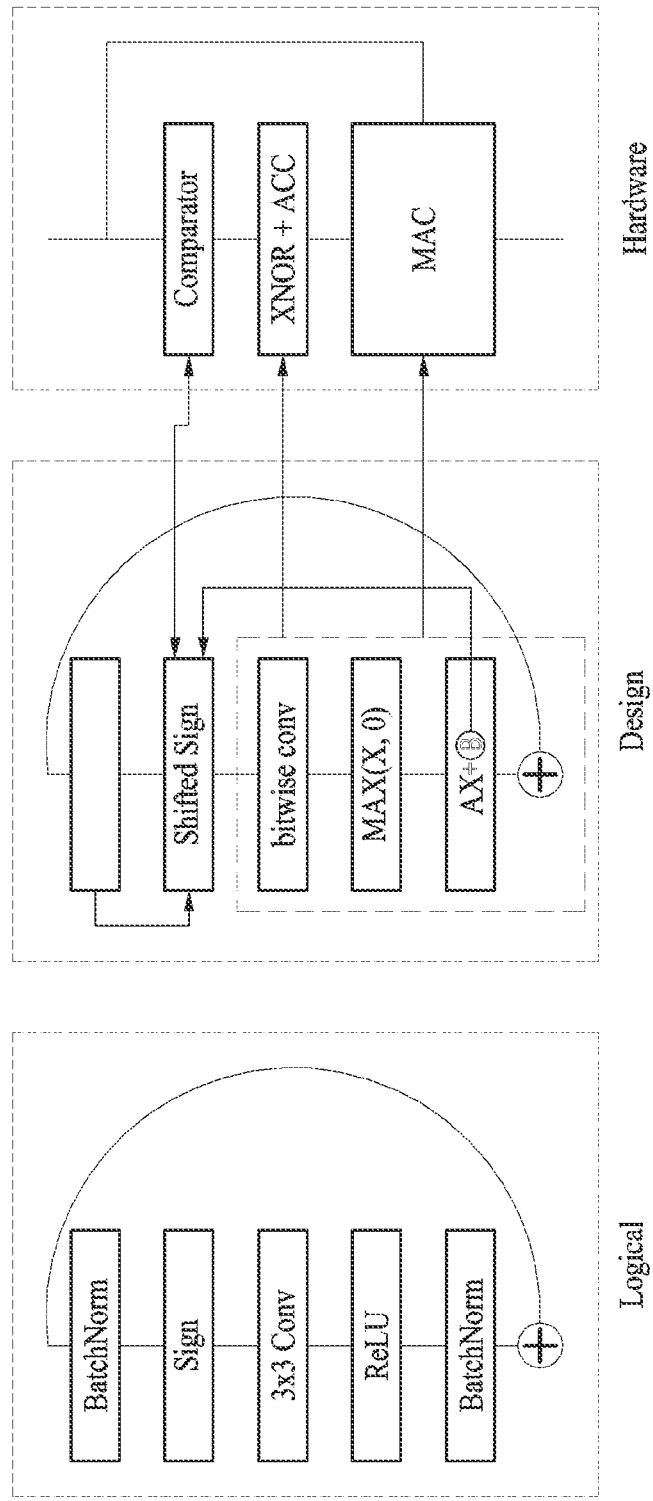

FIGS. 6 and 7 illustrate an example of an electronic device for driving a basic block.

Referring to FIG. 6, an operation in a first batch normalization layer (the first batch normalization layer 310 of FIG. 3, as a non-limiting example) and a quantization layer (the quantization layer 320 of FIG. 3, as a non-limiting example) may be performed through a shifted sign operation.

That is, an operation in the first batch normalization layer may be expressed by Equation 1 below, for example.

$$y = \frac{x-\mu}{\sigma} \cdot \alpha + \beta = \left(\frac{\alpha}{\sigma}\right)x + \left(-\frac{\mu}{\sigma}\alpha + \beta\right) = Ax + B \quad \text{Equation 1}$$

In Equation 1, x denotes input data, y denotes first normalized input data, μ denotes an average of the input data, σ denotes a variance of the input data, α denotes a scale variable of batch normalization, and β denotes a shift variable of the batch normalization. According to Equation 1, the operation in the first batch normalization layer may be expressed as a linear operation, and a MAC may be used to perform the operation in the first batch normalization layer.

An operation performed in the quantization layer (e.g., by a sign function) may be expressed by Equation 2 below, for example.

$$y=\text{Sign}(x) \quad \text{Equation 2:}$$

According to Equation 2, an operation in the quantization layer (e.g., by a sign function) may be performed only by a comparator (the comparator 510 of FIG. 5, as a non-limiting example).

In summary, an operation in the first batch normalization layer and the quantization layer may be expressed by Equation 3 below, for example.

$$y = \text{sign}(Ax + B) = \text{sign}\left(x + \frac{B}{A}\right) \quad \text{Equation 3}$$

According to Equation 3, when a channel unit constant is stored, an operation in the first batch normalization layer and the quantization layer may also be performed using only the comparator.

In addition, an operation in a convolution layer (the convolution layer 330 of FIG. 3, as a non-limiting example) and an activation layer (the active layer 340 of FIG. 3, as a non-limiting example) may be expressed by Equation 4 below, for example.

$$f_n(x)=\text{ReLU}(\text{BinaryConv}_n(\text{ShiftedSign}_n(x))) \quad \text{Equation 4:}$$

where $\text{ShiftedSign}_n(x)=\text{sign}(x+\tau_n)$

The convolution layer may be a bitwise convolution layer performing a convolution operation on binarized data. In addition, the activation layer may use the ReLU function as the activation layer.

An electronic device may derive Equation 6 below by defining a variable as expressed by Equation 5 below, for example.

Let $x'_1=x$, $$x'_2=x_2-B_1=A_1f_1(x_1)+x_1=A_1f_1(x'_1)+x'_1 \quad \text{Equation 5:}$$

Equation 6:
To generalize, we can define $$x'_n = x_n - \sum_i^{n-1} B_i = A_{n-1}f'_{n-1}(x'_{n-1}) + x'_{n-1}$$

and $$\tau'_n = \tau_n + \sum_i^{n-1} B_i$$

where $f'_i(x';\tau'_i)=f_i(x;\tau_i)$.

Thus, the second batch normalized output data of the basic module may be expressed by Equation 7 below, for example. According to Equations 5 and 6, the second portion (e.g., constant 'B') of the second batch normalization may be absorbed into a shift variable of the shifted sine operation of the next basic module. In addition, a first portion (e.g., 'A*X') of the second batch normalization may be calculated through a MAC operation.

$$x'_n=A_{n-1}f'_{n-1}(x'_{n-1})+x'_{n-1}. \quad \text{Equation 7:}$$

According to Equation 7, $x'_n$ may be obtained from $x'_{n-1}$ through one MAC operation.

Referring to FIG. 7, a comparator may quantize input data by comparing a result of performing a sign function operation on the transformed input data with a predetermined value. Here, the transformed input data may be data in which a second portion is reflected in first batch normalized input data.

An XNOR gate and an accumulator may perform a bitwise convolution operation, and a MAC operator may determine output data by applying an activation function to a bitwise convolution operation result, multiply the output data by a first portion, and perform an operation of adding input data.

Figure 8:
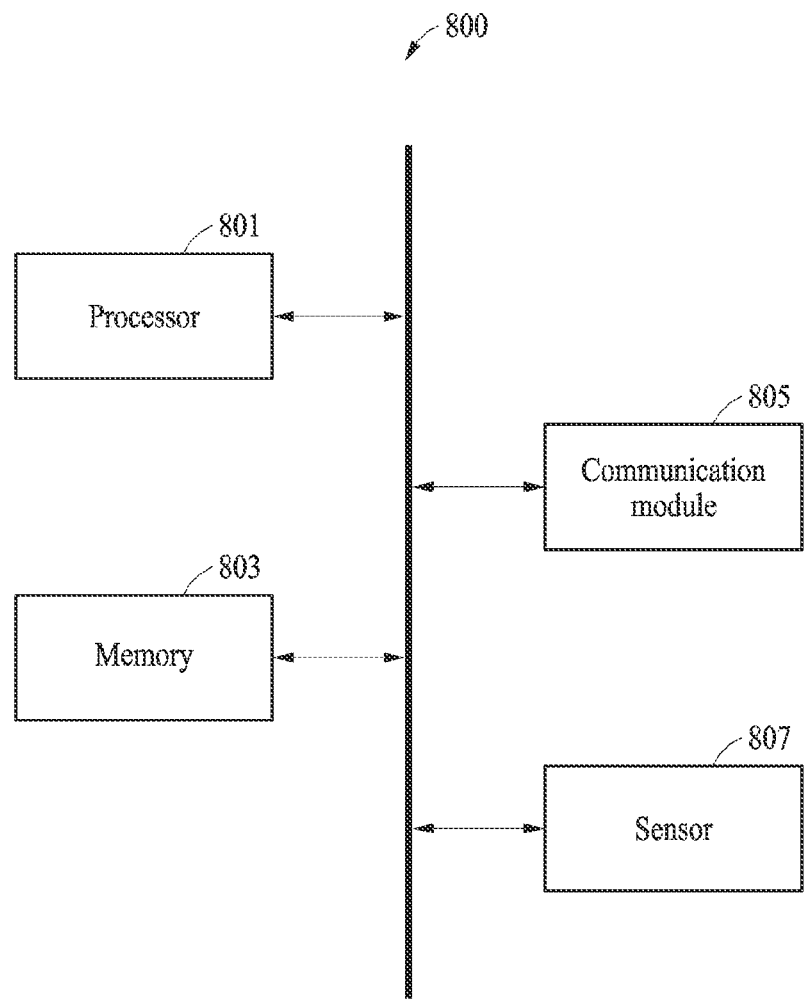
FIG. 8 illustrates an example of a configuration of an electronic device.

FIG. 8 illustrates an example of a configuration of an electronic device.

Referring to FIG. 8, an electronic device 800 (e.g., an electronic apparatus) includes a processor 801 (e.g., one or more processors), a memory 803 (e.g., one or more memories), a communication module 805, and a sensor 807 (e.g., one or more sensors). The electronic device 800 may include an apparatus configured to perform any one, any combination of any two or more of, or all operations described above with reference to FIGS. 1 to 7. For example, the electronic device 800 may include a user device, such as, for example, a smartphone, a personal computer, and a tablet PC, augmented reality (AR) glasses, a sensor, and a server. The electronic device 800 may be or include the electronic device 500 of FIG. 5.

In an example, the processor 801 may perform any one, any combination of any two or more of, or all operations described above with reference to FIGS. 1 to 7. For example, the processor 801 may include the comparator 510, the XNOR gate 520, the accumulator 530, and the MAC operator 540 of FIG. 5. Further, the processor 801 may include both a host processor and a hardware accelerator, where the hardware accelerator includes the comparator 510, the XNOR gate 520, the accumulator 530, and the MAC operator 540 of FIG. 5.

The memory 803 may be a volatile memory or a nonvolatile memory, and may store data related to methods and operations described above with reference to FIGS. 1 to 7. The memory 803 may include, for example, a random-access memory (RAM), a dynamic RAM (DRAM), a static RAM (SRAM), and/or other types of nonvolatile memory that are known in the related technical field.

The electronic device 800 according to an aspect may connect to an external apparatus, for example, a personal computer or a network, through a communication module 805 and may exchange data. For example, the electronic device 800 may receive any of the images described above with reference to FIGS. 1 to 7 that are captured by the sensor 807 (or, as another non-limiting example, from an external sensor through the communication module 805) and may output recognition data or detection data of an object in the images as a result.

In an example, the memory 803 may store a program or instructions for which the methods and operations described above with reference to FIGS. 1 to 7 are implemented. The processor 801 (e.g., the host processor of the processor 801) may execute the program or instructions stored in the memory 803 and may control the electronic device 800 (e.g., the host processor of the processor 801 may command the hardware accelerator of the processor 801 to process input data by executing a neural network). A code of the program executed by the processor 801 may be stored in the memory 803. The memory 803 may store instructions that, when executed by the processor 801, configure the processor 801 to perform any one, any combination of any two or more of, or all operations described above with respect to FIGS. 1 to 7.

In an example, the electronic device 800 may further include other components not illustrated herein. For example, the electronic device 800 may further include an input/output (I/O) interface that includes an input device and an output device as a method for interfacing with the communication module 805. As another example, the electronic device 800 may further include other components, such as a transceiver, a variety of sensors (e.g., the sensor 807), and a database.

The sensor 807 may be or include an image capturing sensor and may be or include, for example, a camera. The sensor 807 may capture any of the images described above with reference to FIGS. 1 to 7

The electronic devices, comparators, XNOR gates, accumulators, MAC operators, processors, memories, communication modules, sensors, electronic device 500, comparator 510, XNOR gate 520, accumulator 530, MAC operator 540, electronic device 800, processor 801, memory 803, communication module 805, sensor 807, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A device, the device comprising:
    a comparator;
    an exclusive-NOR (XNOR) gate;
    an accumulator; and
    a multiplication and accumulation (MAC) operator,
    wherein a basic block of a neural network comprises a first batch normalization layer, a quantization layer, a convolution layer, an active layer, and a second batch normalization layer, and
    wherein the basic block is driven by the device by a combination of a first batch normalization operation, a sign function operation, a bitwise convolution operation, an activation function operation, a second batch normalization operation, and a residual connection operation.

2. The device of claim 1, wherein the comparator is configured to quantize input data by comparing a result of performing the sign function operation on transformed input data with a predetermined value.

3. The device of claim 2, wherein
    the second batch normalization operation comprises a first portion and a second portion, and
    the transformed input data reflects a second portion of first batch normalized input data determined using the first batch normalization operation.

4. The device of claim 1, wherein the XNOR gate and the accumulator are configured to perform the bitwise convolution operation.

5. The device of claim 1, wherein
    the second batch normalization operation comprises a first portion and a second portion, and
    the MAC operator is configured to perform the activation function operation, the residual connection operation, and an operation for the first portion.

6. The device of claim 5, wherein the MAC operator is configured to:
    determine output data by applying the activation function to a bitwise convolution operation result of the bitwise convolution operation;
    multiply the first portion by the output data; and
    perform an operation of adding input data.

7. The device of claim 6, wherein the activation function comprises:
    a rectified linear unit (ReLU) function.

8. A processor-implemented method, the method comprising:
    quantizing input data by comparing a result of performing a sign function operation on transformed input data with a predetermined value using a comparator;
    performing a bitwise convolution operation using an exclusive-NOR (XNOR) gate and an accumulator; and
    performing an activation function operation and a residual connection operation using a multiplication and accumulation (MAC) operator.

9. The method of claim 8, wherein
    a second batch normalization operation comprises a first portion and a second portion, and
    the transformed input data reflects a second portion of first batch normalized input data determined using the first batch normalization operation.

10. The method of claim 8, wherein
    the second batch normalization operation comprises a first portion and a second portion, and
    performing of operations using the MAC operator comprises performing the activation function operation, the residual connection operation, and an operation for the first portion.

11. The method of claim 10, wherein the performing of the operations using the MAC operator comprises:
    determining output data by applying the activation function to a bitwise convolution operation result of the bitwise convolution operation;
    multiplying the first portion by the output data; and
    performing an operation of adding input data.

12. The method of claim 11, wherein the activation function comprises:
    a rectified linear unit (ReLU) function.

13. The method of claim 8, wherein
    a basic block of a neural network comprises a first batch normalization layer, a quantization layer, a convolution layer, an active layer, and a second batch normalization layer, and the basic block is driven by the quantizing of the input data, the performing of the bitwise convolution operation, and the performing of the activation function operation and the residual connection operation.

14. A non-transitory computer-readable storage medium storing instructions that, when executed by one or more processors, configure the one or more processors to perform the method of claim 8.

15. An electronic device, the electronic device comprising:
a host processor configured to control an operation of components comprised in the electronic device; and
a hardware accelerator configured to process input data by executing a neural network based on a command of the host processor,
wherein the hardware accelerator comprises:
a comparator;
an exclusive-NOR (XNOR) gate;
an accumulator; and
a multiplication and accumulation (MAC) operator.

16. The electronic device of claim 15, wherein
the comparator is configured to quantize input data by comparing a result of performing a sign function operation on transformed input data with a predetermined value,
the XNOR gate and the accumulator are configured to perform a bitwise convolution operation, and
the MAC operator is configured to perform an activation function operation and a residual connection operation.

17. A device, the device comprising:
a hardware accelerator configured to, for a first neural network operation:
quantize input data by comparing a predetermined value with a result of performing a sign function operation on transformed input data, the transformed input data being determined using a first batch normalization operation;
perform a bitwise convolution operation on the quantized input data;
determine output data by applying an activation function to a result of the bitwise convolution operation;
multiply a first portion of a second batch normalization operation by the output data; and
perform an operation of adding a result of the multiplying and input data.

18. The device of claim 17, wherein
a comparator of the hardware accelerator is configured to perform the quantizing of the input data,
an exclusive-NOR (XNOR) gate and an accumulator of the hardware accelerator are configured to perform the bitwise convolution operation, and
a multiplication and accumulation (MAC) operator of the hardware accelerator is configured to perform the determining of the output data, the multiplying of the first portion by the output data, and the performing of the operation of adding.

19. The device of claim 17, wherein the hardware accelerator is configured to, for a second neural network operation, perform any one or any combination of any two or more of a pooling, a channel upscaling, and a third batch normalization operation based on a result of the performing of the operation of adding.

* * * * *